United States Patent Office 3,338,977
Patented Aug. 29, 1967

3,338,977
NOVEL HALOGENATED ALCOHOL
Benjamin Veldhuis, Morristown, N.J., assignor to Allied Chemical Corporation, New York, N.Y., a corporation of New York
No Drawing. Filed Mar. 14, 1966, Ser. No. 533,861
1 Claim. (Cl. 260—633)

The subject of this invention is 1,1,1,3,3-pentachloro-3-fluoroisopropanol, a novel halogenated alcohol.

1,1,1,3,3-pentachloro-3-fluoroisopropanol (1FIP) is a 2H-perchlorofluoroisopropanol which possesses an unusual combination of biocidal properties. Other 2H-perchlorofluoroisopropanols are known, the closest in structure being 1,1,1,3,3,3-hexachloroisopropanol (OFIP) and 1,1,3,3-tetrachloro-1,3-difluoroisopropanol (2FIP). As may be seen, OFIP differs from the subject 1FIP in that OFIP possesses an additional chlorine atom substituted for the single fluorine atom in the 1FIP molecule. 2FIP differs from the subject 1FIP in that 2FIP possesses an additional fluorine atom substituted for one of the chlorine atoms in the 1FIP molecule.

It has been found that 1FIP possesses unexpected dual biocidal activity, viz that of a nematocide and as an antifertility agent for houseflies. This dual biocidal activity is surprising in view of the fact that the closely related prior art analogs, viz OFIP and 1FIP posses one one or the other of such biocidal activities, but not both.

1FIP is readily prepared by reacting pentachloromonofluoroacetone with sodium borohydride at a temperature of about 10° to 50° C. in the presence of a solvent for the reactants, such as diethylene glycol dimethyl ether. After the reaction is complete, the reaction mixture is added to an aqueous sulfuric acid solution and distilled to give a mixture of water and 1FIP. The distillate is dehydrated and then subjected to vacuum distillation to yield 1FIP in pure form (B.P. about 69° C./4-5 mm. Hg).

The pentachloromonofluoroacetone starting material may be prepared by distillation of the crude ketones obtained by the reaction of hexachloroacetone with anhydrous HF, while in the presence of a catalyst comprising dichromium trioxide, and at temperatures in the range of about 250–550° C. The dichromium trioxide catalyst is derived from hydrous chromic oxide formed by ammonia precipitation from a trivalent chromium salt solution and subjected to heat treatment substantially in the range of about 300–400° C. for not less than about two hours. The hydrofluorination process and method for preparing the dichromium trioxide catalyst are described in more detail in co-pending application of Henry R. Nychka et al. entitled, "Preparation of Hexafluoroacetone and Perchlorofluoroacetones," Ser. No. 226,439, filed Sept. 26, 1962 and now Patent No. 3,257,457.

The following examples will serve to illustrate preparation of the novel alcohol and its unusual properties.

*Example 1.—Production of 1,1,1,3,3-pentachloro-3-fluoroisopropanol*

8.0 g. (.21 mole) of sodium borohydride and 150 g. of diethylene glycol dimethyl ether were placed in a reaction vessel equipped with a mechanical stirrer. 113 g. (.45 mole) of pentachloromonofluoroacetone (B.P. 94–100° C./100 mm. Hg) were then added, with stirring, to the above mixture over a period of 1⅓ hours at 25° to 35° C. The resulting reaction mixture was stirred overnight and was then added to a mixture of 100 ml. of water and 30 ml. of concentrated sulfuric acid. An oil layer separated. The oil layer was vacuum distilled from an equal volume of 96% $H_2SO_4$ yielding 66 g. of a colorless product boiling at 69° C./4-5 mm. Hg. Redistillation of the product over $H_2SO_4$ gave 40 g. (.16 mole) boiling at the same temperature. The product was identified as 1,1,1,3,3-pentachloro-3-fluoroisopropanol (1FIP). Mole percent conversion of the pentachloromonofluoroacetone charged to 1FIP was 35.5%.

*Analysis.*—Calculated for $C_3H_2Cl_5FO$: percent F, 7.6; percent H, 0.8. Found: percent F, 6.2; percent H, 0.7.

Infrared spectographic analysis showed the expected hydroxyl band at 2.8 microns. The proton and fluorine NMR spectra are compatible with the assigned structure showing a hydroxyl group, proton split by fluorine and fluorine split by hydrogen.

*Example 2*

OFIP, 1FIP and 2FIP were tested for nematocidal properties by the following procedure. Panagrellus Redivivus (Linné) nematodes were placed in 2 inch x ¾ inch petri dishes containing 5 ml. of distilled water. The dishes were placed in gallon mason jars. 0.1 cc. units each of OFIP, 1FIP and 2FIP were pipetted onto absorbent cellulose wads and the wads were put into the mason jars. The jars were then sealed. After 24 hours' exposure, the mason jars were opened, the nematode containers were removed and mortality counts were made immediately and at one and two day intervals. A check was also run by following the above procedure excepting that no test compound was pipetted onto the absorbent cellulose wad. The results of the tests made are set forth in following Table I.

TABLE I

| Test Compound | Percent Mortality | | |
|---|---|---|---|
| | 0 Days | 1 Day | 2 Days |
| Check | Check count [1] | Check count | Check count. |
| OFIP | Check count or less. | Check count or less. | Check count or less. |
| 1FIP | 100 | 100 | 100. |
| 2FIP | 100 | 100 | 100. |

[1] Check count—small number of nematodes lost for reasons other than the presence of a toxic material, e.g., injury, infirmity, etc.

*Example 3*

OFIP, 1FIP and 2FIP were tested as antifertility agents for houseflies by the following procedure: Dried food bait (6 parts non-fat dry milk, 6 parts granulated sugar and 1 part powdered egg) was treated with the test compounds which were dispersed 1% by weight in acetone solutions. After the acetone solutions dried on the food, the food was pulverized into a fine powder. The pulverized food was then placed in emergence cages containing fly pupae. Cages containing untreated food were used as checks. Examination of each cage was made periodically to determine emergence conditions of the flies. Nine days after the start of the test, oviposition medium was placed in each cage and on the following day the medium was examined for eggs. If no eggs were present, the medium was moistened and examined daily until oviposition occurred or until all adults were dead. The results of the tests made are shown in the following table.

TABLE II

Test compound:                                  Egg status
    OFIP _____ No eggs laid.
    1FIP _____ Do.
    2FIP _____ Eggs laid.[1]
    Check _____ Do.[1]

[1] Larvae normal.

It can thus be seen from above Tables I and II that 1FIP possesses dual biocidal properties of a nematocide and of an antifertility agent, whereas 0FIP and 2FIP each possess one but not both of such properties. This dual pesticidal activity of 1FIP could not have been predicted from the properties of the closely related 0FIP and 2FIP compounds known to the art. The dual pesticidal activity of 1FIP is advantageous in that it provides a single chemical which is capable of performing functions which heretofore would have required stocking of both 0FIP and 2FIP.

I claim:
1,1,1,3,3-pentachloro-3-fluoroisopropanol.

References Cited

UNITED STATES PATENTS
3,134,710  5/1964  Gilbert _____ 167—22

FOREIGN PATENTS
1,370,349  7/1964  France.

OTHER REFERENCES
Smith et al.: Industrial and Engineering Chemistry, vol. 49, No. 8 (1957), page 1242.

LEON ZITVER, *Primary Examiner.*

H. T. MARS, N. J. KING, JR., *Assistant Examiners.*